US 9,480,010 B2

(12) United States Patent
Kaba

(10) Patent No.: US 9,480,010 B2
(45) Date of Patent: Oct. 25, 2016

(54) ONBOARD AVIONIC SYSTEM FOR COMMUNICATION BETWEEN AN AIRCRAFT AND THE GROUND AND METHOD FOR MANAGING A RADIO CHANNEL OF SUCH A SYSTEM

(71) Applicant: Airbus Operations (SAS), Toulouse (FR)

(72) Inventor: Mohamed Kaba, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/045,819

(22) Filed: Feb. 17, 2016

(65) Prior Publication Data
US 2016/0255572 A1    Sep. 1, 2016

(30) Foreign Application Priority Data

Feb. 27, 2015    (FR) ..................................... 15 51692

(51) Int. Cl.
*H04W 4/00* (2009.01)
*H04W 48/16* (2009.01)
*H04W 4/02* (2009.01)

(52) U.S. Cl.
CPC ............ *H04W 48/16* (2013.01); *H04W 4/025* (2013.01)

(58) Field of Classification Search
CPC ............... H04N 21/4126; H04N 7/18; H04N 21/2146; H04N 21/4784; H04N 21/41422; H04N 7/10; H04N 21/422; H04N 21/812; H04N 21/4222; H04N 21/43637; H04N 21/47202; H04N 21/478; H04N 21/47815; H04N 7/16
USPC ....... 455/515, 66, 431, 90.2, 129, 68, 456.1, 455/525, 509, 562.1, 63.4; 701/3, 14; 709/227, 249, 228; 725/23, 77, 105, 725/37, 76, 30; 340/963, 945; 348/143
See application file for complete search history.

(56) References Cited

U.S. PATENT DOCUMENTS 6,308,045 B1 * 10/2001 Wright ................. G05D 1/0055
340/945
6,522,867 B1 *  2/2003 Wright ................. G05D 1/0055
340/945
6,577,419 B1 *  6/2003 Hall ....................... H04B 10/40
398/115

(Continued)

OTHER PUBLICATIONS

French Search Report, Jan. 11, 2016, priority document.

(Continued)

*Primary Examiner* — Tan H Trinh
(74) *Attorney, Agent, or Firm* — Greer, Burns & Crain Ltd.

(57) ABSTRACT

An onboard avionic system for communication between an aircraft and the ground comprising a service unit connected to various aircraft equipment and a radio communications unit providing communication between the avionic system and a communications system on the ground via a radio channel. The system comprises a configuration unit having a control unit, a geolocation unit and a database in which are recorded, data relative to the use of the radio channels which are available in a flight zone, as well as data relative to the radio conditions for the available radio channels. The configuration unit, on the basis of the aircraft geolocation data supplied by the geolocation unit, of radio condition data of the current channel, and of database data, determines if the current channel should be changed or not and, if so, determines the new channel to be used and commands the change to the new channel.

9 Claims, 5 Drawing Sheets

(56) References Cited

U.S. PATENT DOCUMENTS

| | | | | |
|---|---|---|---|---|
| 7,131,136 B2* | 10/2006 | Monroe | ........... | G08B 13/19641 340/945 |
| 8,103,271 B2* | 1/2012 | Calderhead, Jr. | .. | H04B 7/18506 455/431 |
| 8,589,994 B2* | 11/2013 | Monroe | ........... | G08B 13/19641 340/945 |
| 9,008,868 B1* | 4/2015 | Bantoft | ................... | B64C 19/00 701/3 |
| 2003/0055975 A1* | 3/2003 | Nelson | ............... | H04B 7/18506 709/227 |
| 2003/0130770 A1* | 7/2003 | Matos | ................. | G05D 1/0022 701/3 |
| 2004/0008253 A1* | 1/2004 | Monroe | ........... | G08B 13/19641 348/143 |
| 2004/0062269 A1* | 4/2004 | Western | ............... | H04L 1/0025 370/465 |
| 2006/0229104 A1* | 10/2006 | de La Chapelle | . | H04B 7/18506 455/562.1 |
| 2007/0130599 A1* | 6/2007 | Monroe | ........... | G08B 13/19641 725/105 |
| 2008/0004000 A1 | 1/2008 | Boss et al. | | |
| 2009/0017777 A1* | 1/2009 | Malaga | ................. | H04B 1/406 455/90.2 |
| 2009/0298451 A1* | 12/2009 | Malaga | .................... | H04B 1/40 455/129 |
| 2010/0041342 A1* | 2/2010 | Pollock | .............. | H04B 7/18506 455/68 |
| 2010/0087190 A1* | 4/2010 | Pandit | ................ | H04B 7/18506 455/431 |
| 2010/0167723 A1* | 7/2010 | Soumier | ............ | H04B 7/18506 455/431 |
| 2011/0314487 A1* | 12/2011 | Keen | .................. | B64D 11/0015 725/23 |
| 2011/0314488 A1* | 12/2011 | Keen | .................. | H04B 7/18506 725/23 |
| 2011/0314489 A1* | 12/2011 | Keen | .................. | B64D 11/0015 725/23 |
| 2011/0314490 A1* | 12/2011 | Keen | ........................ | H04N 7/18 725/23 |
| 2011/0314507 A1* | 12/2011 | Keen | ........................ | H04N 7/18 725/77 |
| 2012/0075122 A1* | 3/2012 | Whitlow | .................. | A61B 5/18 340/963 |
| 2012/0191273 A1* | 7/2012 | Jacobs | ............... | H04B 7/18508 701/3 |
| 2012/0303826 A1* | 11/2012 | Nelson | ............... | H04B 7/18506 709/228 |
| 2013/0013134 A1* | 1/2013 | Lieu | ..................... | G01C 23/005 701/14 |
| 2014/0075506 A1* | 3/2014 | Davis | ..................... | H04L 67/12 726/3 |
| 2014/0126456 A1* | 5/2014 | Song | .................. | H04N 21/6405 370/312 |
| 2014/0274180 A1* | 9/2014 | DuBois | ................. | H04W 72/04 455/509 |
| 2014/0282684 A1* | 9/2014 | Keen | .................. | H04N 21/2146 725/30 |
| 2014/0282727 A1* | 9/2014 | Keen | .................. | H04N 21/4222 725/37 |
| 2016/0016671 A1* | 1/2016 | Fournier | ................ | G01C 23/00 340/963 |
| 2016/0155337 A1* | 6/2016 | Krishna | ............... | G08G 5/0013 345/8 |

OTHER PUBLICATIONS

"Modeling Rational Agents with a BDI-Architecture", Anand S. Rao and M.P. Georgeff; published in Proceedings of the 2nd International Conference on Principles of Knowledge Representation and Reasoning, pp. 473-484, Feb. 1991.

* cited by examiner

ONBOARD AVIONIC SYSTEM FOR COMMUNICATION BETWEEN AN AIRCRAFT AND THE GROUND AND METHOD FOR MANAGING A RADIO CHANNEL OF SUCH A SYSTEM

CROSS-REFERENCES TO RELATED APPLICATIONS

This application claims the benefit of the French patent application No. 1551692 filed on Feb. 27, 2015, the entire disclosures of which are incorporated herein by way of reference.

BACKGROUND OF THE INVENTION

The present invention relates to an onboard avionic system for communication between an aircraft and the ground and a method for managing a radio channel of such a system.

The technical field of the present invention is that of data communications between aircraft in flight and ground stations, such as stations for air traffic control, stations for airline companies, stations for aircraft maintenance, etc. FIG. 1 shows an air data communications system to which the present invention applies. This communications system comprises a ground system 10 for transmitting data and, in each aircraft, an avionic communication system 20.

The ground communications system 10 comprises ground stations 2, 3 and 4 providing wireless communications with the avionic communication systems 20 of aircraft 5. The ground station 2 provides communications in a frequency band called VHF, the ground station 3 provides communications in a frequency band called HF and the ground station 4 provides communications relayed by a satellite 6. The communications system 10 also comprises ground stations 7, 8 and 9 respectively for providing, by way of example, air traffic control services, airline company services and maintenance services. The ground stations 7, 8 and 9 and the ground stations 2, 3 and 4 exchange data between each other via a network 1.

FIG. 2 shows an avionic communications system 20 present in each aircraft 5. It comprises a service unit 21 to which are connected different equipment 22, 23, 24, 251 to 25N. The equipment 22, 23, 24 are constituted by equipment which between them form a man-machine interface for the pilots of the aircraft in question and are, conventionally, a printer 22 for printing messages transmitted to the aircraft, a keyboard 23 for inputting messages intended for a ground station and an alarm 24. The equipment 251 to 25N are devices for measuring or detecting flight conditions of the aircraft in question. Radio communications units 26, 27 and 28 are also connected to the service unit 21. The radio communications unit 26 provides communications in a frequency band called VHF, the radio communications unit 27 provides communications in a band called HF and the radio communications unit 28 provides satellite communications. The service unit 21 is, for example, a router which allows the exchange of data between the equipment 22, 23, 24, 251 to 25N of the aircraft in question and the radio communications units 26, 27 and 28 and beyond, with the ground stations 2, 3 and 4 and furthermore, via the network 1, with the ground stations 7, 8 and 9.

Among the air data communication systems can be mentioned the networks called ATN (Aeronautical Telecommunication Network) or the network called ACARS (Aircraft Communication Addressing and Reporting System).

Digital data are thus exchanged between an aircraft and a ground station and this can be either at the initiative of the pilots of the aircraft in question or at the initiative of a ground station or automatically at regular time intervals. The digital data can relate to messages about flight conditions of the aircraft in question sent by the aircraft to a control tower or vice-versa, information messages to the pilots or to the air traffic controllers, or to maintenance workshops or to the airline company to which the aircraft belongs, etc.

With the increase in the number of flights, the problem of congestion of radio resources which may not be available at the moment of exchanging data arises. If the VHF frequency band which extends from 118 MHz to 137 MHz is considered, the use of a single frequency contributes to this congestion, notably in certain flight zones more congested than others.

SUMMARY OF THE INVENTION

The purpose of the present invention is to provide an onboard avionic system for communication between an aircraft and the ground comprising a service unit to which are connected various equipment of the aircraft and at least one radio communications unit for providing communication between the avionic system and a communications system on the ground via a radio channel.

According to an essential feature of the present invention, the system is characterized in that it comprises moreover a configuration unit provided with a control unit, a geolocation unit provided for supplying the control unit with data related to the present position of the aircraft and a database in which are recorded, for each flight zone that the aircraft has flown over during previous flights, data relative to the use of the radio channels which are available in the flight zone in question as well as data relative to the radio conditions for the radio channels. The configuration unit is interfaced with the radio communications unit which is provided for supplying the configuration unit with data relative to the current radio conditions of the channel in use. The configuration unit, on the basis of the geolocation data of the aircraft which are supplied to it by the geolocation unit, of data on the radio conditions of the channel used supplied by the radio communications unit and of data coming from the database, determines if the channel currently used by the radio communications unit should be changed or not and, if such is the case, determines the new channel to be used and commands the change to the new channel to be used.

BRIEF DESCRIPTION OF THE DRAWINGS

The features of the invention mentioned below, as well as others, will appear more clearly on reading the following description of example embodiments, the description being given with reference to the appended drawings, in which.

DETAILED DESCRIPTION OF THE PREFERRED EMBODIMENTS

Figure 3:
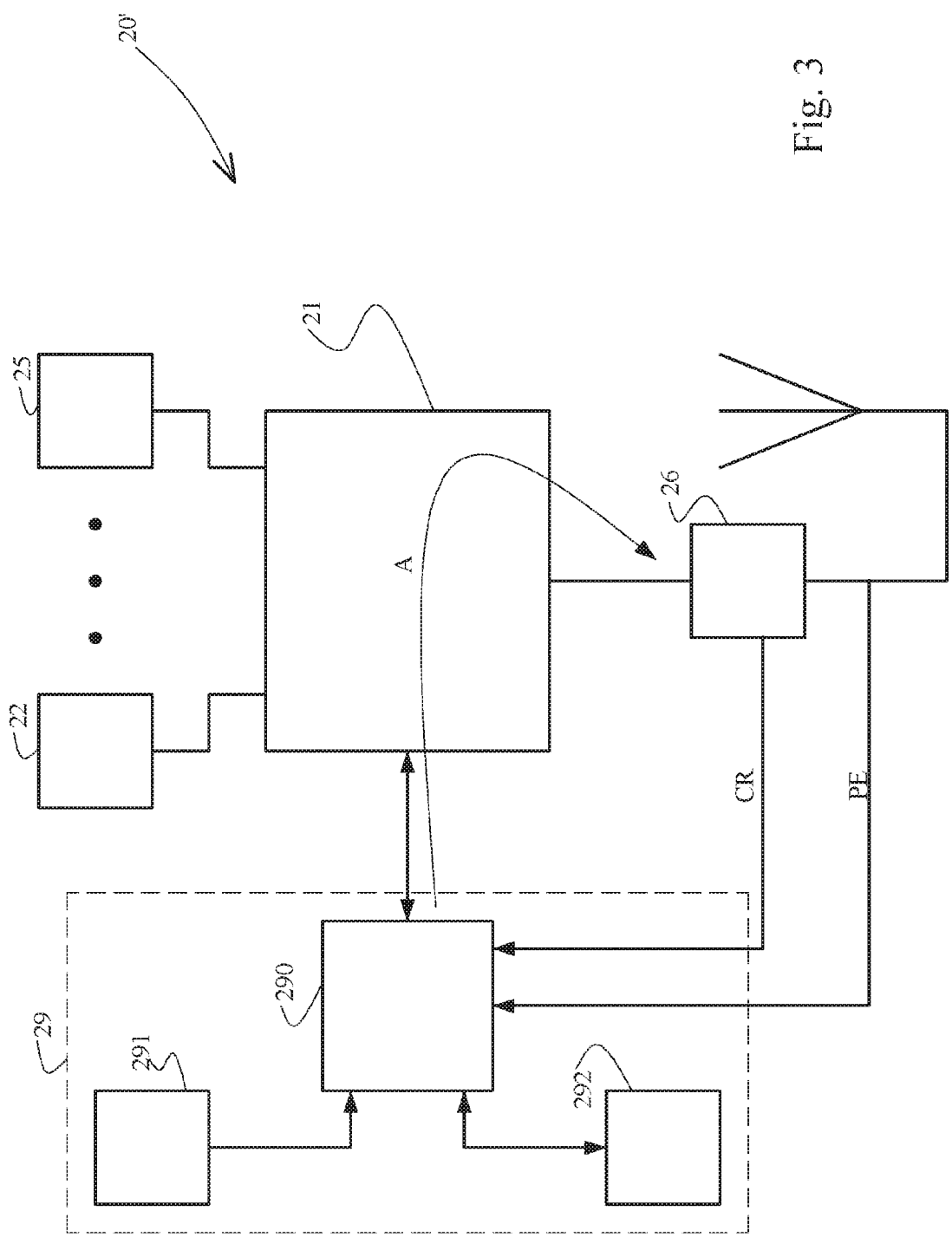
FIG. 3 is a block diagram of an avionic communication system according to the present invention.

The avionic communication system 20' shown in FIG. 3 is intended to be installed in an aircraft in order to be able to communicate with ground stations, for example either in a VHF frequency band or in an HF frequency band.

Figure 2:
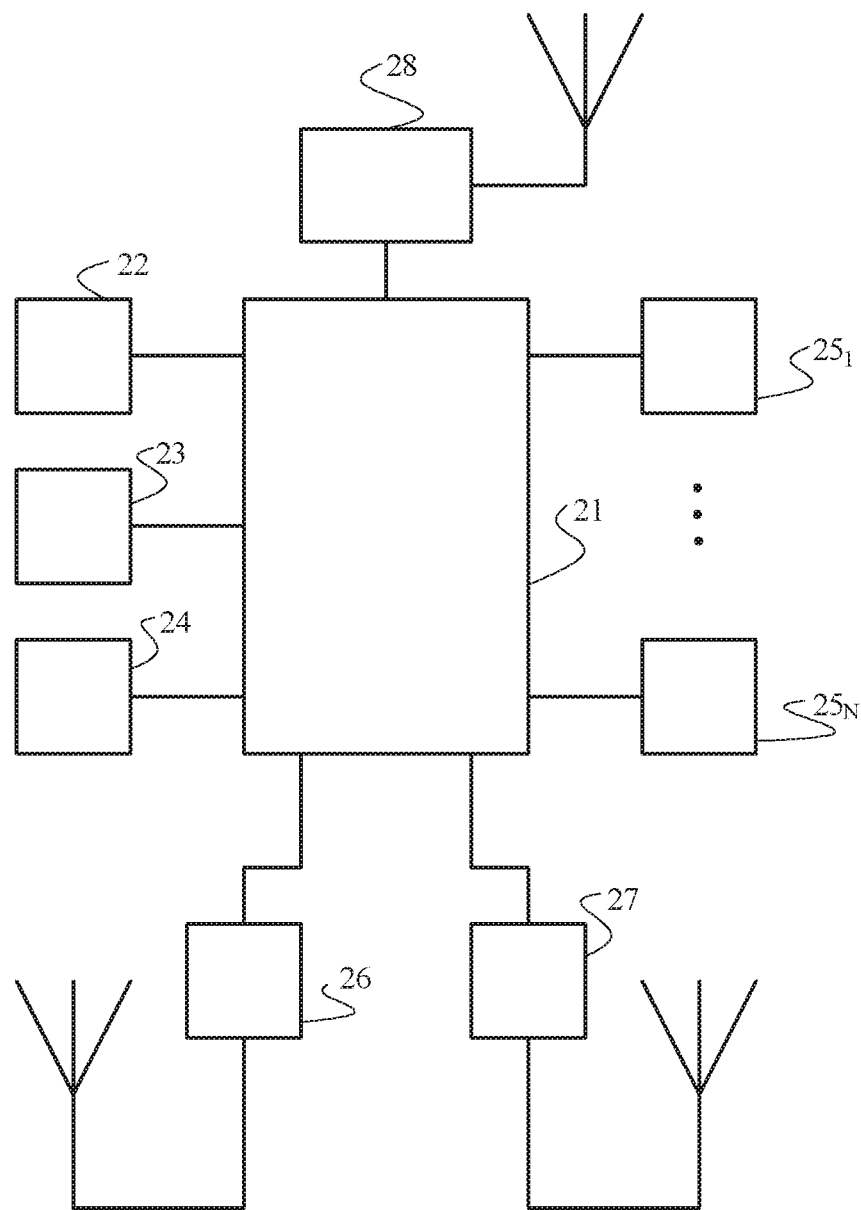
FIG. 2 is a block diagram of an avionic communication system according to the prior art.

The avionic communication system 20' comprises, like the one which is shown in FIG. 2, a service unit 21, equipment 22 to 25 and radio communications units (only one 26 is shown in FIG. 3). The elements which are identical to those of the prior art shown in FIG. 2 operate in an identical manner to those of that prior art. They are given the same references in FIG. 3, as in FIG. 2.

Hereafter, only one single radio communications unit 26 of the VHF type will be considered, this being done in order not to confuse the present description. The invention can however be applied to any type and number of radio communications units: VHF, HF, satellite, etc.

The avionic communication system 20' comprises, moreover, a radio configuration unit 29 which comprises a control unit 290 which receives, from the radio communications unit 26, radio conditions data CR for the channel used. For example, the radio communications unit 26 delivers these radio conditions data at specified time intervals. These radio conditions data relate to different characteristics of the radio communications channel used in the flight zone flown over, such as the power of the signal received on each channel, the occupation rate of each channel between two deliveries of radio conditions data CR, the reception bit error rate of the channel etc. The control unit 290 receives the radio signals PE from the radio environment of the aircraft and can thus determine the radio conditions data of all of the channels that are available for data communications.

It will be noted that, in the present description, it will be considered that a channel is available when the communications system as a whole allows its use. Moreover, a channel is occupied when a third party user uses the channel for its communications. The channel is used when the user in question communicates via this channel The radio configuration unit 29 comprises moreover a geolocation unit 291 in order to supply the control unit 290 with data related to the present position (notably longitude and latitude) of the aircraft in question, notably in order to determine the flight zone flown over by the aircraft in question.

Finally, the radio configuration unit 29 furthermore comprises a database 292 in which are recorded, for each flight zone and for each flight, of a set of previous flights, data relative to the use of the available channels and data relative to the radio conditions existing during the previous flight in question and in the flight zone in question.

Figure 1:
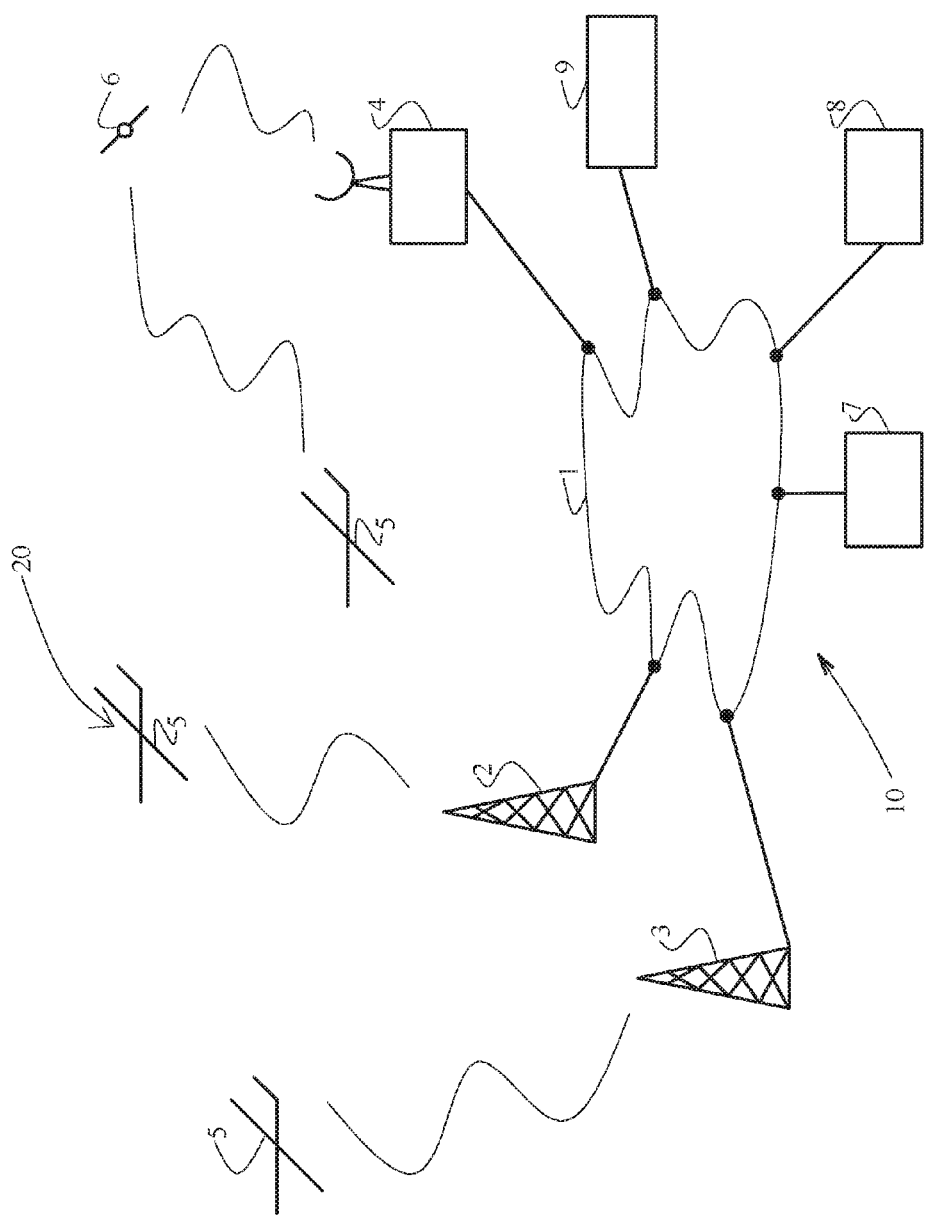
FIG. 1 is an overall diagrammatic view of a communication system to which the present invention applies.

On the basis of the geolocation data of the aircraft which are supplied to it by the geolocation unit 291, of the radio conditions data CR of the present flight supplied by the radio communications unit 26 and of the data coming from the database 292 relative to the use of the available channels and of the data relative to the radio conditions CR existing during previous flights in the flight zone corresponding to the geolocation of the aircraft, the configuration unit 29 determines if the channel currently in use by the radio communications unit 26 should be changed or not. If such a change must be operated, the configuration unit 29 determines the new channel to be used by basing itself on the radio conditions determined, by the control unit 290, from the signals PE of the radio environment radio and on predetermined criteria and transmits to the service unit 21 a request for a channel change supplied (arrow A) to the radio communications unit 26. This request is, for example, transmitted to the ground station (see FIG. 1) and, after approval by the latter, the channel change becomes effective.

Moreover, the configuration unit 29 stores in the database 292 the data relative to the use of the channel which has just been left together with data relative to the radio conditions CR existing at the time of that storage, doing this in order to be able to improve its decision making for future flights, as will be seen in the continuation of the present description.

Thus, the configuration unit 29 plans and decides the possible channel changes necessary in order to optimize the radio resources and does this on the basis of the radio conditions data determined from the PE environment signals and of data contained in the database 292, this being done for the flight zone corresponding to the geolocation given by the geolocation unit 291. This notably makes it possible to prevent the channel used from becoming congested.

The configuration unit 29 can use any type of intelligent or automatic learning algorithm, that is to say, one which makes decisions not only on the basis of data relative to the present radio conditions data but also on the basis of information relative to previous flights in the zone in question, such as the use of available channels, their occupation rate, etc.

By way of example, according to one embodiment of the configuration unit 29, the algorithm used has BDI (the acronym for Believe-Desire-Intention) architecture. Such an architecture is, for example, described in an article by Anand S. Rao and M. P. Georgeff entitled "Modeling Rational Agents with a BDI-Architecture" published in Proceedings of the 2nd International Conference on Principles of Knowledge Representation and Reasoning, pages 473-484, and incorporated herein by reference. An embodiment of the configuration unit 29 with BDI architecture is shown in FIG. 4.

Figure 4:
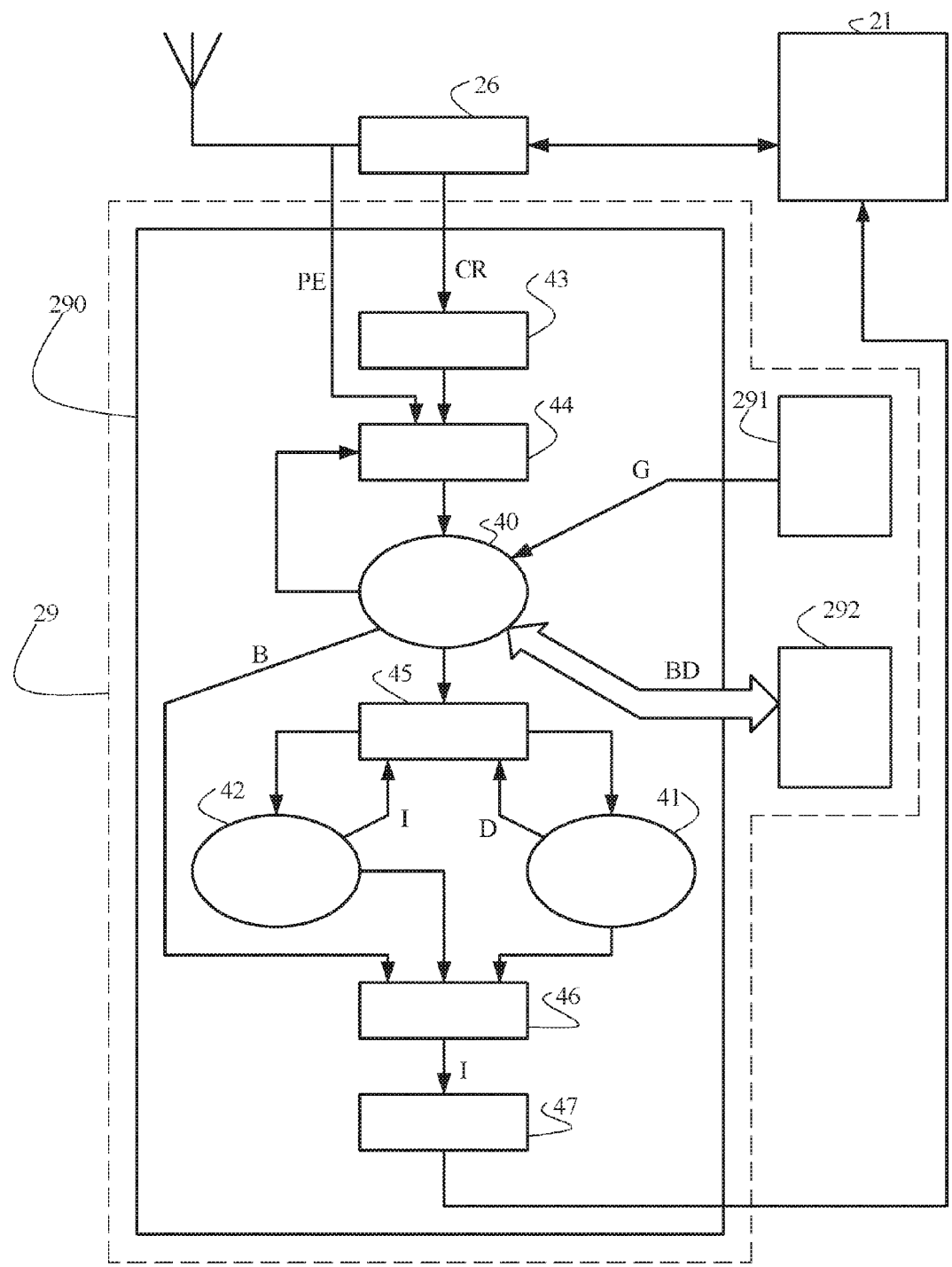
FIG. 4 is a diagram representing the different steps which are used by a configuration unit of an avionic communication system according to the present invention.

In this FIG. 4, there can be seen the radio communications unit 26, the service unit 21, the geolocation unit 291, the database 292 and the control unit 290. The latter implements a method whose steps are represented inside the box 290. More precisely, inside this box 290, the rectangles represent processes composed of one or more steps which are executed by the control unit 290 while the ovals represent items of information relative to the aircraft in question which are used for the execution of these steps. More precisely, the oval 40 represents the items of information which are stored in the database 292 for the flight zone in which the aircraft in question is situated such as those located by the geolocation unit 291 (hence the arrows BD and G). As mentioned above, these items of information are relative to the use of the available channels in the flight zones for previous flights and data relative to the radio conditions. All of this information is collectively referred to as "Beliefs."

The oval 41 represents the criterion or criteria which are used for classifying the different radio channels to be used by the radio communications unit 26. These criteria are also called "Desires."

With regard to the oval 42, this represents the actions that the control unit 290 implements in order to choose the optimum radio channel. These actions are also called "Intentions."

One function of the radio communications unit 26 is to determine the current radio conditions, such as for example the channel currently being used, its reception power, its reception error rate or its rate of occupation calculated at regular intervals of time (for example every millisecond) and to transmit the radio conditions values CR to the control unit 290.

The change decision process 43 triggers a channel change when the value of at least one of the radio conditions parameters is greater than or less than, depending on the case, a predetermined threshold value, that is to say when the radio conditions are poor, for example, when the reception power of the channel is less than a predetermined threshold or, for example again, when the error rate on this channel is greater than a predetermined threshold or, for example again, when the occupation rate is greater than a predetermined threshold S (for example, the threshold S can be defined as 25%).

Rather than comparing a radio conditions parameter with a predetermined threshold, according to a particular embodiment, it is the average assumed by this radio conditions parameter over a set of measuring time intervals which is taken into consideration. More precisely and, for example, the value CU of the occupation rate of the channel is transmitted by the radio communications unit 26 every millisecond and the average is calculated every second or every minute. It is this average which is compared with a predetermined threshold.

According to a particular embodiment, the channel change decision is made by the change decision process 43 when the predetermined threshold is exceeded several times (for example 2 times) in succession.

Figure 5A:
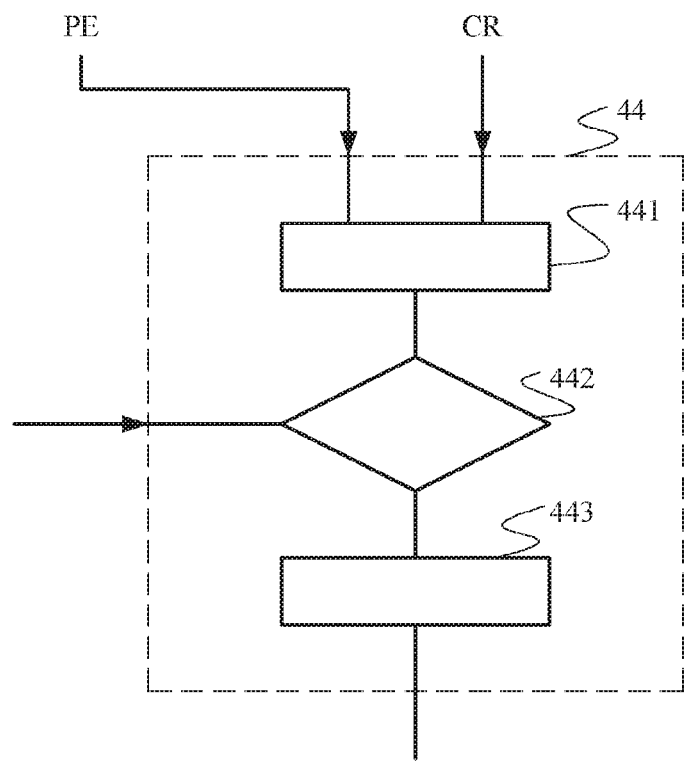
FIGS. 5a and 5b are diagrams of processes which are used by the configuration unit of an avionic communication system according to the present invention.

An update procedure 44 is initiated when the change decision process 43 has decided on a channel change. It comprises the following steps (see FIG. 5*a*):

- a step 441 of calculating the values taken by the radio conditions parameter or parameters (reception power, error rate, occupation rate, etc.) for the available channels other than the channel which is currently in use and which will be left and doing this on the basis of the signals PE of the radio environment of the aircraft,
- a step 442 of comparison of these values with those which are stored in the database 292 for the flight zone (given by the geolocation unit 291) that the aircraft is flying over (oval 40),
- a step 443 of updating the database 292 for the flight zone currently being flown over when the present values are different from those which are contained in the database 292.

An example embodiment of the change decision 43 and updating 44 processes is given below. Let it be considered that the currently used channel is channel CH1. Its occupation rate as a function of time is for example given by the following table. It is recalled that the threshold value of the occupation rate is 25%.

| T1 | T2 | T3 | T4 | T5 | T6 |
|----|----|----|----|----|----|
| 20% | 28% | 20% | 35% | 30% | Etc. |

At the time T5, the occupation rate has exceeded the predetermined threshold of 25% twice in succession. The channel change is triggered at this time T5.

At the time T5, the value of the occupation rate of the currently used channel CH1 and the value of the occupation rate of each of the other available channels CH2 to CH4 such as determined in step 441 from the environment signals PE are given in the following table.

| CH1 | CH2 | CH3 | CH4 |
|-----|-----|-----|-----|
| 30% | 18% | 23% | 12% |

It is assumed that in the database 292 are recorded the following values for two previous flights V1 and V2 and for the present flight, this being in the present flight zone.

TABLE 1

| | Channel | Number of uses | Occupation rate | Occupation rate |
|---|---|---|---|---|
| Flight V1 | CH1 | 2 | 27 | 12 |
| | CH2 | 0 | 30 | 15 |
| | CH3 | 1 | 21 | 20 |
| | CH4 | 0 | 30 | 33 |
| Flight V2 | CH1 | 1 | 12 | |
| | CH2 | 0 | 20 | |
| | CH3 | 0 | 21 | |
| | CH4 | 0 | 18 | |
| Present flight | CH1 | 0 | 31 | |
| | CH2 | 1 | 17 | |
| | CH3 | 0 | 24 | |
| | CH4 | 0 | 31 | |

For example, with regard to the present flight, a channel change has already been operated from channel CH2 to channel CH1. The occupation rates recorded are those that were recorded at the time of this change.

If, in the database 292, these four values of occupation rate (30, 18, 23, 12) are already recorded for a preceding flight and for the same flight zone then the database 292 is not updated.

On the other hand, if they are not there, as is the case here, the update is carried out. Thus, channel CH1 is mentioned as having been used once again, for the present flight and in the present flight zone, and possibly in all of the flight zones previously passed through by the aircraft in question since the last change (which is not the case here as a change has already been operated as mentioned above). The four values of occupation rate are also recorded for the present flight and for the present flight zone.

The database 292 now appears in the following form.

TABLE 2

| | Channel | Number of uses | Occupation rate | Occupation rate |
|---|---|---|---|---|
| Flight V1 | CH1 | 2 | 27 | 12 |
| | CH2 | 0 | 30 | 15 |
| | CH3 | 1 | 21 | 20 |
| | CH4 | 0 | 30 | 33 |
| Flight V2 | CH1 | 1 | 12 | |
| | CH2 | 0 | 20 | |
| | CH3 | 0 | 21 | |
| | CH4 | 0 | 18 | |
| Present flight | CH1 | 1 | 31 | 30 |
| | CH2 | 1 | 17 | 18 |
| | CH3 | 0 | 24 | 23 |
| | CH4 | 0 | 31 | 12 |

The rest of the method will now be described.

A process of generating options 45 generates different options for configuration of the radio communications unit 26 as a function of desires (oval 41) and of intentions (oval 42) based on the items of information contained in the database 292 for the present flight zone.

Desire comprises having a channel providing a good quality of service.

Intention comprises having a channel having an occupation rate below the authorized threshold.

Figure 5B:
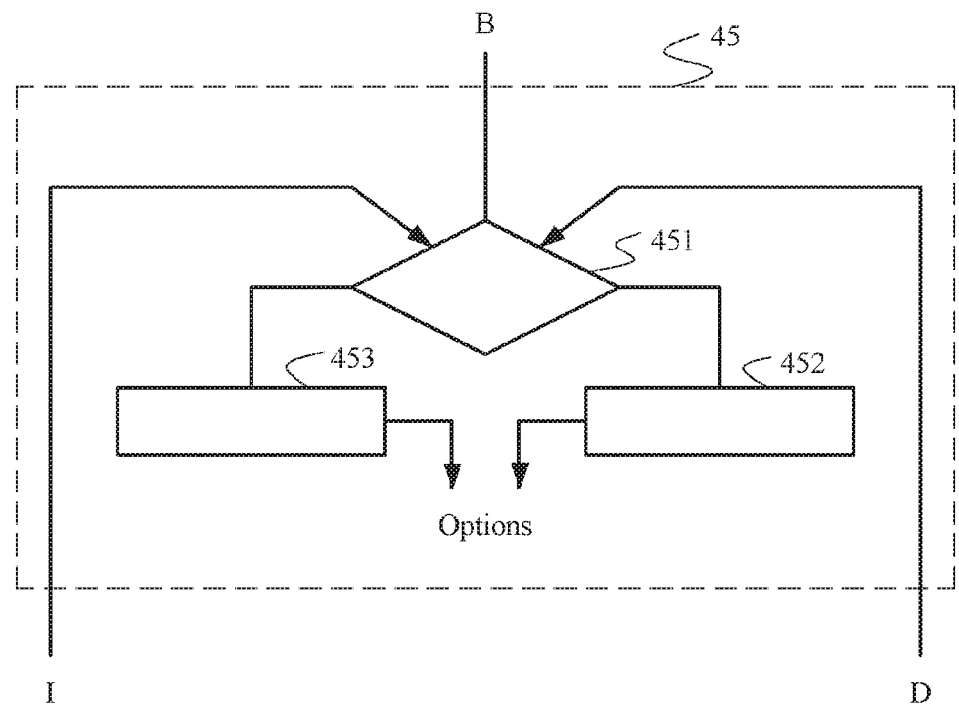

The process of generating options 45 comprises the following steps (see FIG. 5b):

- a step 451 of determination of the available channels conforming with the desire or desires D, if at least one of them exists. For example, a channel conforms with the desire (oval 41) when its occupation rate is at least 10% below a predetermined threshold (that is at most 15% if the threshold S is 25%),
- a step 452, used in the case of at least one conforming available channel, of classification of the conforming channel or channels as a function of their current occupation rates, according to a first option, and as a function of their respective frequencies of use for all of the previous flights for the flight zone in question, according to a second option. The frequency of use of a channel in a given flight zone is for example determined as being the average use of this channel for all of the previous flights, each use during a flight in a flight zone being stored in the database 292,
- a step 453, used when no channel conforms with the desire or desires D (occupation rate higher than the predetermined threshold reduced by 10%), of classification of the available channel or channels as a function of their current occupation rates, according to a first option, and as a function of their respective frequencies of use for all of the previous flights for the flight zone in question, according to a second option.

Assume, for example, that the present value of the occupation rate of each available channel in a flight zone is given by the following table.

| CH1 | CH2 | CH3 | CH4 |
|-----|-----|-----|-----|
| 30% | 14% | 23% | 12% |

There are two available channels which conform with the desire (occupation rate lower than S(=25%)−10%=15%).

The first option (classification as a function of occupation rate) gives: CH4, CH2.

It will be noted that if there are several desires, each option relates to the conformity with all of these desires.

Assume that the database 292 conforms with the above table 2. The frequencies of use for the two previous flights V1 and V2 then conform with the following table.

| CH1 | CH2 | CH3 | CH4 |
|-----|-----|-----|-----|
| 75% | 0   | 25% | 0   |

The classification according to the second option then gives CH1, CH3.

Assume now that the present values of the occupation rate of each available channel are given by the following table.

| CH1 | CH2 | CH3 | CH4 |
|-----|-----|-----|-----|
| 30% | 23% | 12% | 12% |

The first option gives: CH3=CH4 while the second option still gives CH1, CH3.

The method of the invention also comprises a filtering process 46 which comprises choosing the best ratio between the possible options based on the desires (oval 41), the intentions (oval 42) and the beliefs (oval 40). The filtering method (46) therefore results in the determination of a new radio channel to be used for replacing the radio channel currently in use. This choice becomes the intention which is then executed by a control process (step 47) comprising commanding, via the service unit 21, the use of a new radio channel by the radio communications unit 26.

In the examples given above, in the case where the channels CH2 and CH4 conform with the desire, the filtering process 46 will choose the channel CH4. In the other case, the filtering process 46 will observe that the first option does not make it possible to decide which channel to choose between CH3 and CH4 but that the second one does allow this, channel CH3 present in the first option being present again in the second one.

The service unit 21 receives the change of configuration request indicating the new channel to be used and then transmits, by means of the radio control unit 26, a message to a station on the ground for a change of radio configuration. After an acknowledgement from a ground station, the communications take place using the new radio configuration.

Thus, each time that the aircraft in question moves into a flight zone where the channel that it is using for its communications has an occupation rate greater than an authorized threshold, the change of radio configuration procedure previously described is again implemented.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An onboard avionic system for communication between an aircraft and the ground comprising:
   - a service unit to which are connected various equipment of said aircraft,
   - at least one radio communications unit for providing communication between said avionic system and a communications system on the ground via a radio channel,
   - a configuration unit provided with a control unit,
   - a geolocation unit provided for supplying the control unit with data related to the present position of said aircraft and
   - a database in which are recorded, for each flight zone that the aircraft has flown over during previous flights, data relative to the use of the radio channels which are available in said flight zone in question as well as data relative to the radio conditions for said available radio channels,
   - said configuration unit being interfaced with said radio communications unit such that said radio communications unit supplies said configuration unit with data relative to the radio conditions of the channel currently in use, said configuration unit, on the basis of the geolocation data of the aircraft which are supplied to the configuration unit by the geolocation unit, of data on the radio conditions of the channel currently in use supplied by the radio communications unit and of data coming from the database, being configured to determine if the channel currently used by the radio communications unit should be changed or not and, if such is the case, being configured to determine the new channel to be used and being configured to command the change to the new channel to be used.

2. The avionic system as claimed in claim 1, wherein said configuration unit is also configured to store in the database the data relative to the use of the channel which has just been left, as well as data relative to the radio conditions existing at the time of this storage.

3. The avionic system as claimed in claim 1, wherein said configuration unit is used by an algorithm having BDI architecture, the beliefs being formed from data stored in said database, the desire or desires being constituted by criteria which are used for classifying the different radio channels to be used by the radio communications units and the intentions being the actions carried out by the control unit in order to command the change of radio channel.

4. A method for managing the radio channel to be used by a radio communications unit of an avionic communication system of an aircraft, comprising:
   a service unit to which are connected various equipment of said aircraft,
   at least one radio communications unit for providing communication between said avionic system and a communications system on the ground via a radio channel,
   a configuration unit provided with a control unit,
   a geolocation unit provided for supplying the control unit with data related to the present position of said aircraft and
   a database in which are recorded, for each flight zone that the aircraft has flown over during previous flights, data relative to the use of the radio channels which are available in said flight zone in question as well as data relative to the radio conditions for said available radio channels,
   said configuration unit being interfaced with said radio communications unit such that said radio communications unit supplies said configuration unit with data relative to the radio conditions of the channel currently in use,
   said configuration unit, on the basis of the geolocation data of the aircraft which are supplied to the configuration unit by the geolocation unit, of data on the radio conditions of the channel currently in use supplied by the radio communications unit and of data coming from the database, being configured to determine if the channel currently used by the radio communications unit should be changed or not and, if such is the case, being configured to determine the new channel to be used and being configured to command the change to the new channel to be used,
   wherein said method comprises:
   detecting, with said configuration unit, change in radio conditions for determining, on the basis of geolocation data of the aircraft which are supplied to it by a geolocation unit, data on radio conditions of the channel currently being used provided by the radio communications unit and of data relative to the use of the radio channels which are available in said flight zone in question, as well as data relative to the radio conditions for said radio channels, coming from the database, if the channel currently in use by the radio communications unit should be changed or not,
   filtering, with said configuration unit, available radio channels in said flight zone for determining the new channel to be used and
   controlling, with said configuration unit, the radio communications unit by commanding a change to said new channel to be used by said radio communications unit.

5. The management method as claimed in claim 4, further comprising a step of updating the database by storing in the database the data relative to the use of the channel which has just been left as well as data relative to the radio conditions existing at the time of the storage.

6. The management method as claimed in claim 4, wherein said method is implemented with the configuration unit by an algorithm having BDI architecture, the beliefs being formed by data stored in said database, the desire or desires being constituted by criteria which are used for classifying the different radio channels to be used by the radio communications units and the intentions being the actions carried out by the control unit in order to command the change of channel radio.

7. The management method as claimed in claim 4, wherein said change decision process triggers a change of channel when the value of at least one of the radio conditions parameters is greater or less, according to the case, than a predetermined threshold value.

8. The management method as claimed in claim 4, further comprising an updating process initiated when the change decision process has decided on a channel change, said updating process comprising the following steps:
   calculating the values taken by the radio conditions parameter or parameters for the available channels other than the channel which is currently in use and which will be left,
      comparing these values with those which are stored in the database for the flight zone given by the geolocation unit and
   updating the database for the current flight zone when the present values are different from those which are contained in the database.

9. The management method as claimed in claim 4, further comprising a process of generating options which comprises the following steps:
   determining the available channels conforming with the desire or desires, if at least one of them exists,
      classifying, in the case of at least one conforming available channel, the conforming channel or channels as a function of their current occupation rates, according to a first option, and as a function of their respective frequencies of use for all of the previous flights for the flight zone in question, according to a second option, and
      classifying, when no channel conforms with the desire, the available channel or channels as a function of their current occupation rates, according to a first option, and as a function of their respective frequencies of use for all of the previous flights for the flight zone in question, according to a second option.

* * * * *